(12) United States Patent
Schmand et al.

(10) Patent No.: US 7,408,164 B2
(45) Date of Patent: Aug. 5, 2008

(54) DETECTOR ARRAY UTILIZING AIR GAPS AS A REFLECTOR BETWEEN ARRAY ELEMENTS

(75) Inventors: Matthias J. Schmand, Lenoir City, TN (US); Lars A. Eriksson, Oak Ridge, TN (US); Niraj K. Doshi, Knoxville, TN (US); Mehmet Aykac, Knoxville, TN (US); Ronald Nutt, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 518 days.

(21) Appl. No.: 10/441,682

(22) Filed: May 20, 2003

(65) Prior Publication Data

US 2004/0232343 A1    Nov. 25, 2004

(51) Int. Cl.
*G01T 1/20* (2006.01)
(52) U.S. Cl. ............... 250/368; 250/367; 250/361 R
(58) Field of Classification Search ........... 250/368, 250/367, 363.01, 363.02, 363.03, 363.04, 250/363.06, 370.01, 370.07, 370.09, 361 R, 250/458.1
See application file for complete search history.

(56) References Cited

U.S. PATENT DOCUMENTS

| | | | |
|---|---|---|---|
| 3,936,645 A | 2/1976 | Iverson | |
| 4,749,863 A | 6/1988 | Casey | |
| 4,914,301 A | 4/1990 | Akai | |
| 4,982,096 A | 1/1991 | Fujii et al. | |
| 5,059,800 A | 10/1991 | Cueman et al. | |
| 5,091,650 A * | 2/1992 | Uchida et al. | 250/366 |
| 5,329,124 A * | 7/1994 | Yamamoto et al. | 250/367 |
| 5,453,623 A * | 9/1995 | Wong et al. | 250/363.03 |
| 5,773,829 A * | 6/1998 | Iwanczyk et al. | 250/367 |
| 6,087,663 A * | 7/2000 | Moisan et al. | 250/367 |
| 6,292,529 B1 | 9/2001 | Marcovici et al. | |
| 6,344,649 B2 * | 2/2002 | Riedner et al. | 250/367 |
| 6,552,348 B2 * | 4/2003 | Cherry et al. | 250/363.03 |
| 6,841,783 B2 * | 1/2005 | Malmin | 250/368 |

* cited by examiner

*Primary Examiner*—David P. Porta
*Assistant Examiner*—Mark R Gaworecki
(74) *Attorney, Agent, or Firm*—Peter L Kendall

(57) ABSTRACT

A detector array including a plurality of scintillators for use in association with an imaging device. The detector array is provided for accurate determination of the location of the impingement of radiation upon an individual scintillator detector. An air gap is disposed between the scintillator elements, thereby increasing the packing fraction and overall sensitivity of the array. The amount of light transmitted down the scintillator element and the amount of light transmitted to adjacent elements is modified to optimize the identification of each element in a position profile map by adjusting the surface finish of the detector elements.

18 Claims, 4 Drawing Sheets

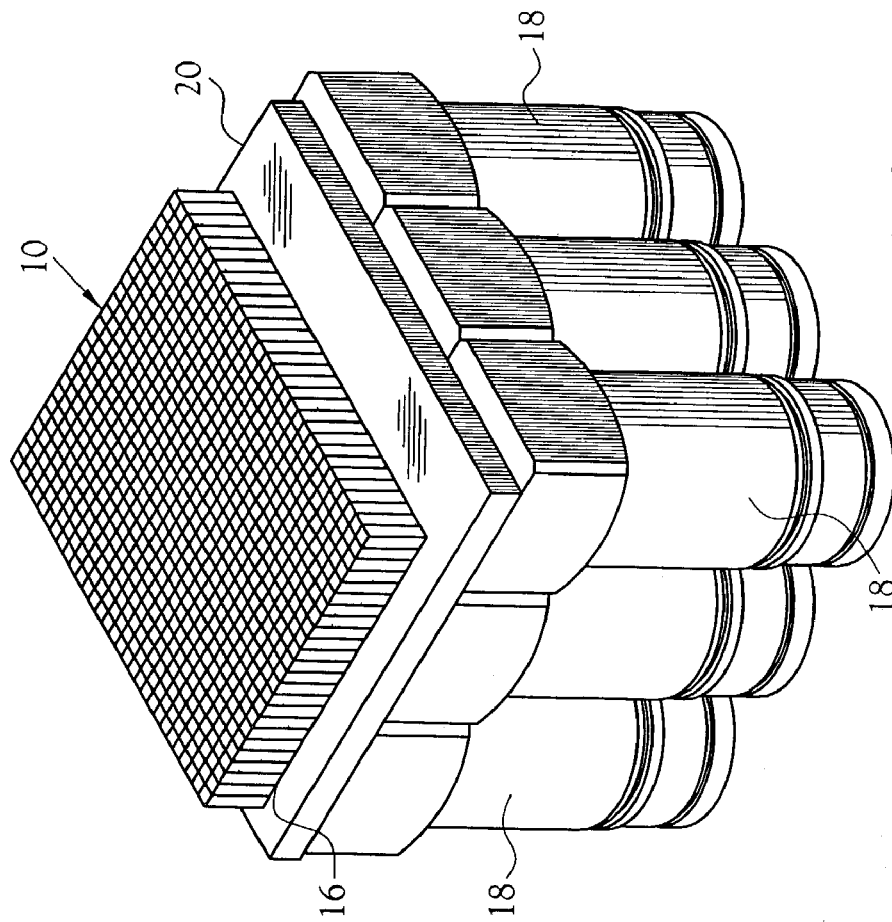
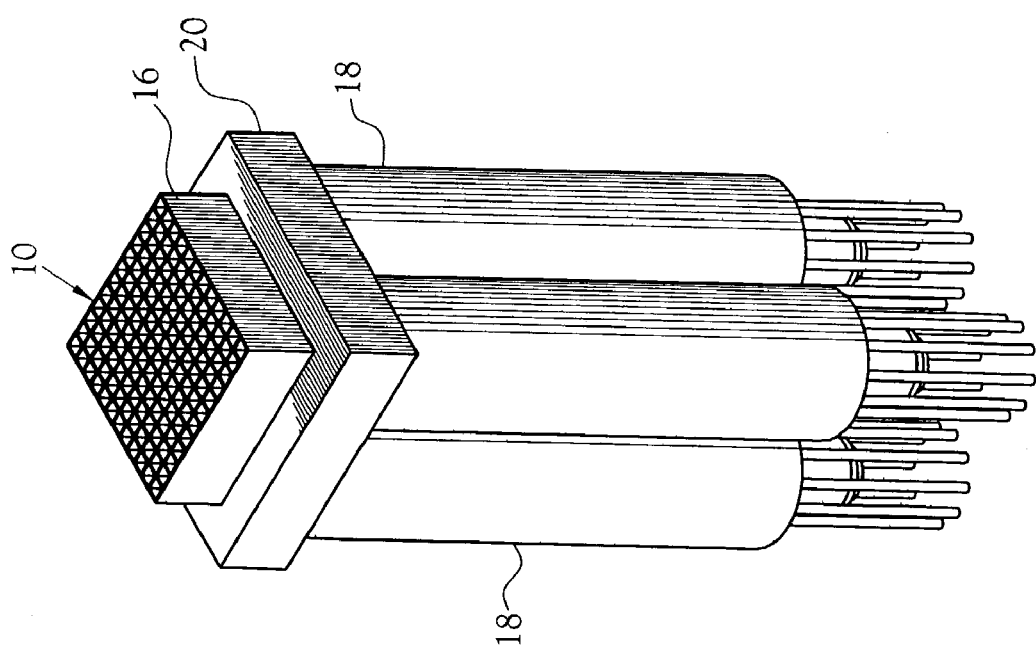

DETECTOR ARRAY UTILIZING AIR GAPS AS A REFLECTOR BETWEEN ARRAY ELEMENTS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a method for fabricating a detector array for use in imaging applications such as X-ray imaging, fluoroscopy, positron emission tomography (PET), single photon emission computed tomography (SPECT), computed tomography (CT), gamma camera and digital mammography systems. More particularly, the present invention provides a simple and highly effective detector array design and its fabrication with high packing fraction resulting in greater sensitivity while still maintaining spatial resolution.

2. Description of the Related Art

In the field of imaging, it is well known that imaging devices incorporate a plurality of scintillator arrays for detecting radioactivity from various sources. It is also common practice, when constructing scintillator arrays composed of discrete scintillator elements, to pack the scintillator elements together with a reflective medium interposed between the individual elements creating photon boundaries. Conventionally the reflective medium serves to collimate the scintillation light along the crystal element into a light guide to accurately assess the location at which the radiation impinges upon the detector elements. The reflective medium further serves to increase the light collection efficiency from each scintillator element as well as to minimize the cross-talk, or light transfer (transmission of light), from one scintillator element to an adjacent element. Reflective mediums include reflective powders, film, paint, adhesives doped with reflective powders or a combination of materials.

Conventionally, scintillator arrays have been formed from polished or rough crystals that are either: hand-wrapped in reflective PTFE tape and bundled together; glued together using a white pigment such as $BaSO_4$ or $TiO_2$ mixed with an epoxy or RTV; or glued to a glass light guide with defined spacing and afterwards filled with reflective material as discussed above.

Another approach utilizes individual reflector pieces that are bonded to the sides of the scintillator element with the aid of a bonding agent. This process requires iterations of bonding and cutting until a desired array size is formed.

Other devices have been produced to form an array of scintillator elements. Typical of the art are those devices disclosed in the following U.S. Patents:

| U.S. Pat. No. | Inventor(s) | Issue Date |
|---|---|---|
| 3,936,645 | A. H. Iverson | Feb. 3, 1976 |
| 4,749,863 | M. E. Casey | Jun. 7, 1988 |
| 4,914,301 | Y. Akai | Apr. 3, 1990 |

-continued

| U.S. Pat. No. | Inventor(s) | Issue Date |
|---|---|---|
| 4,982,096 | H. Fujii et al. | Jan. 1, 1991 |
| 5,059,800 | M. K. Cueman et al. | Oct. 22, 1991 |
| 6,292,529 | S. Marcovici et al. | Sep. 18, 2001 |

Of these patents, the '645 patent issued to Iverson discloses a radiation sensitive structure having an array of cells. The cells are formed by cutting narrow slots in a sheet of luminescent material. The slots are filled with a material opaque to either light or radiation or both. The '800 patent issued to Cueman et al., discloses a similar scintillator array wherein wider slots are formed on the bottom of the array.

Most of the aforementioned methods require a separate light guide attached to the bottom of the detector array to channel and direct the light in a definitive pattern on to a receiver or set of receivers such as photomultiplier tubes or diodes. This light guide usually contains cuts in varying depths to alter the light pattern on the receivers. In addition the cuts are filled with reflective material as discussed in '863 patent issued to Casey.

BRIEF SUMMARY OF THE INVENTION

The present invention is a detector array for use in imaging applications such as X-ray imaging, fluoroscopy, positron emission tomography (PET), single photon emission computed tomography (SPECT), computed tomography (CT), gamma camera and digital mammography systems. The detector array includes a plurality of scintillators for use in association with an imaging device. The array is fabricated such that the location of the impingement of radiation upon an individual scintillator detector, or crystal element, is accurately determinable. This design allows an efficient, consistent, accurate, and cost-effective process for creating an array with high packing fraction, high light output, high sensitivity and high uniformity.

The detector array of the present invention provides an air gap between the individual scintillator elements, thereby eliminating the need for reflective material. The crystal elements are closely packed together and held by friction. The close packing minimizes the spacing between the crystal elements and therefore maximizes the packing fraction or array sensitivity. In addition, the detector array of the present invention simplifies the light guide by eliminating the cuts and allowing the use of an uncut light guide. The required thickness of the light guide is significantly reduced relative to light guides used in association with prior art detector arrays, thereby effectively reducing the amount of light absorption in the light guide.

BRIEF DESCRIPTION OF THE SEVERAL VIEWS OF THE DRAWINGS

The above-mentioned features of the invention will become more clearly understood from the following detailed description of the invention read together with the drawings in which:

FIG. 3 is a perspective illustration of the detector array of the present invention in use in association with a block detector;

FIG. 4 is a perspective illustration of the detector array of the present invention in use in association with a panel detector;

DETAILED DESCRIPTION OF THE INVENTION

A detector array and method of fabrication thereof for use in imaging applications such as X-ray imaging, fluoroscopy, positron emission tomography (PET), single photon emission computed tomography (SPECT), computed tomography (CT), gamma camera and digital mammography systems is provided. The detector array is illustrated at 10 in the figures. The detector array, or array 10, includes a plurality of scintillators 12 for use in association with an imaging device (not illustrated). The array 10 is fabricated such that location of the impingement of radiation upon an individual scintillator detector 12 is accurately determinable. The present invention provides for the creation of a highly packed, high light output, high sensitivity, uniform, scintillator array 10 in an efficient, consistent, accurate and cost-effective manner. Air gaps 14 are formed between the scintillator elements.

Figure 1:
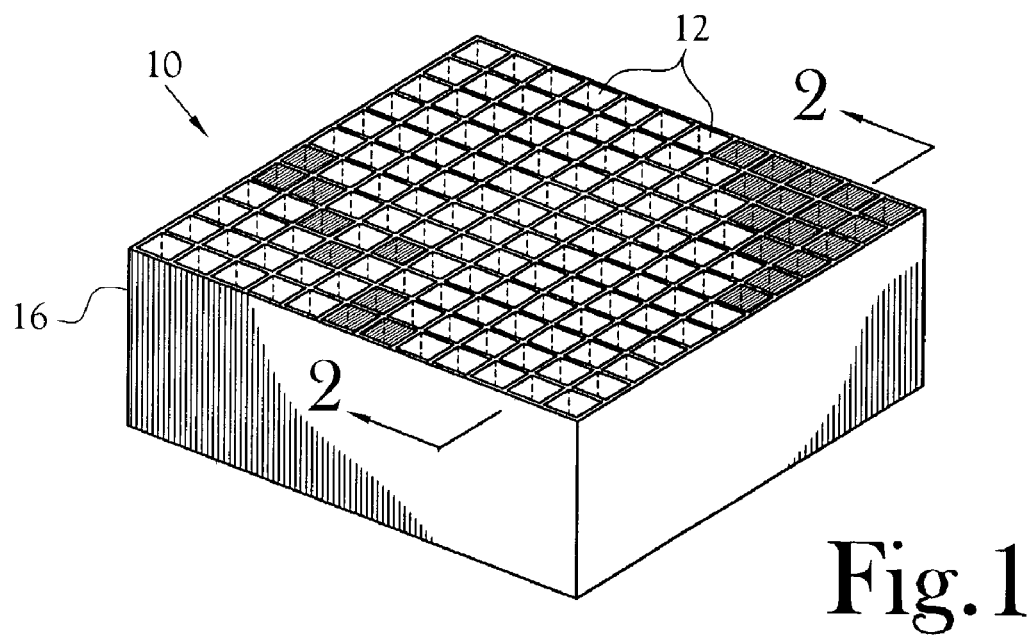
FIG. 1 is a perspective illustration of the detector array of the present invention.

As best illustrated in FIG. 1, the array 10 defines an M×N array of scintillator elements 12. In the illustrated embodiment, the array 10 defines a 12×12 matrix of scintillator elements 12. However, it will be understood that "M" and "N" are independently selectable, with "M" being less than, equal to, or greater than "N". It will also be understood that, while the array 10 is illustrated as defining a square scintillator array, it will be understood that the array 10 of the present invention is not limited to this configuration. The array 10 can be of one or a combination of more than one geometric configuration such as diamond, triangular, rectangular, hexagonal, and octagonal.

Figure 2:
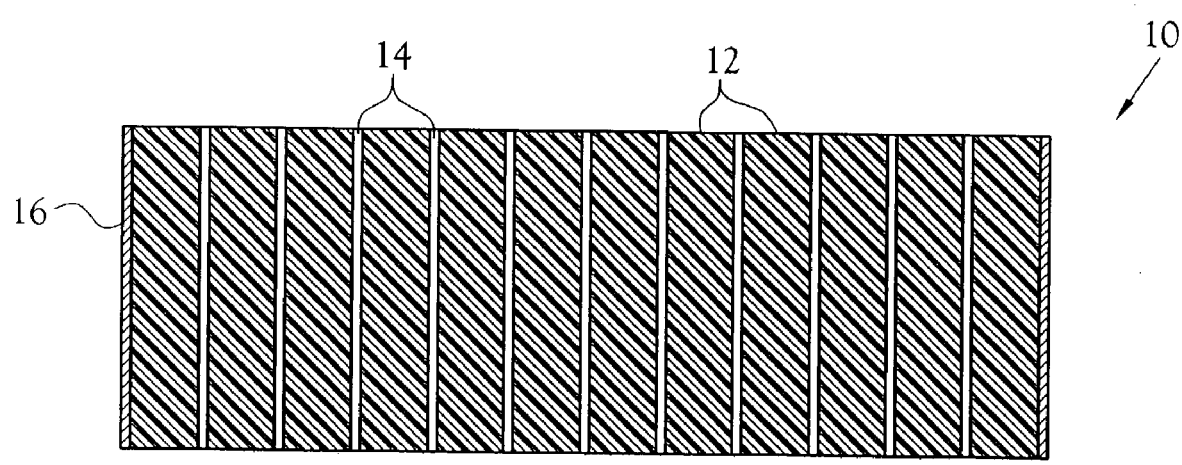
FIG. 2 is a side elevation view of the array, in section, taken along lines 2-2 of FIG. 1.

FIG. 2 illustrates a cross-sectional view of the array 10 in FIG. 1. The width of the air gaps 14 is exaggerated for clarity. The air gaps 14 in the present invention are dependent upon the surface finish of the detector elements 12. To this extent, in the preferred embodiment, the scintillator elements 12 are optimized in order to maximize the light collection efficiency of the array 10. Optimization of the scintillator elements 12 in some applications entails polishing the surfaces to achieve a selected finish. The scintillator elements 12 are tightly packed and held together either in a friction fit or by bonding the scintillator elements 12 to a selected surface.

To this extent, a mechanism 16 for maintaining the relative positions of the individual scintillator elements 12 with respect to each other is provided. In the illustrated embodiment of FIGS. 1-3, the mechanism 16 is a retainer disposed about the outermost scintillator elements 12 to maintain the relative positions of the individual scintillator elements 12. The retainer 16 is fabricated from conventional materials such as shrink wrap, rubberized bands, tape or a combination of like materials may be used to enclose or hold the array together in a tight, uniform fashion. Although illustrated as spanning the entire height of the array 10, the retainer 16 may in some applications include one or more retainers 16 which span only a portion of the height of the array 10.

In the embodiment illustrated in FIG. 4, the mechanism 16 is a bonding agent applied between one end of each scintillator element 12 and a light guide 20. As discussed below, the light guide 20 is not required in all applications. Accordingly, although not illustrated, in those applications the scintillator elements 12 are bonded to the photodetectors 18.

The air gaps 14, in conjunction with the surface finish of the scintillator elements 12, define the light collection efficiency of the scintillator elements 12 as well as the amount of light sharing that occurs between the elements 12. The significant change in the index of refraction (IOF) from a scintillator element 12 and air 14 increases the angle of total refraction. Based on the ratio IOF(scintillator)/IOF(air) and the surface finish of the scintillator element 12 the amount of scintillation light photons is tuned such that a controlled amount of photons are collimated down through a scintillator element 12 and a controlled amount are transmitted to neighboring elements 12. The optimal ratio is customized for each scintillator element 12 within the array 10 such that each element 12 in the array 10 is clearly identified. The ratio may be spatially variant.

Illustrated in FIG. 3 is a three-dimensional view of the array 10 composed of scintillator elements 12. The array of scintillator elements 10 is coupled to at least one photodetector 18 selected from, but not limited to, photomultiplier tubes, position sensitive photomultiplier tubes, avalanche photodiodes, pin diodes, CCDs, and other solid state detectors.

A light guide 20 is selectively placed between the array 10 and the receiving photodetectors 18. The light guide 20 defines a selected configuration, such as being segmented or continuous. It will be understood that the light guide 20 is optional and, when employed, is optimized depending on the choice of scintillator elements 12 and photodetectors 18.

In this arrangement, the scintillators 12 disposed within the array 10 serve to detect an incident photon and thereafter produce a light signal corresponding to the amount of energy deposited from the initial interaction between the photon and the scintillator element 12. The array 10 serves to reflect and channel the light down the scintillator element 12 to the coupled light guide 20 and to the photodetector 18. The signal generated by the photodetector 18 is then post-processed and utilized in accordance with the purpose of the imaging device.

Illustrated in FIG. 4 is a plurality of arrays 10 disposed above a continuous light guide 20. As discussed previously, the relative positions of the individual scintillator elements 12 are maintained via a mechanism 18 which is a bonding agent applied between the scintillator elements 12 and the continuous light guide 20. The continuous light guide 20 is disposed above an array of photodetectors 18, such as in a panel detector.

Figure 5:
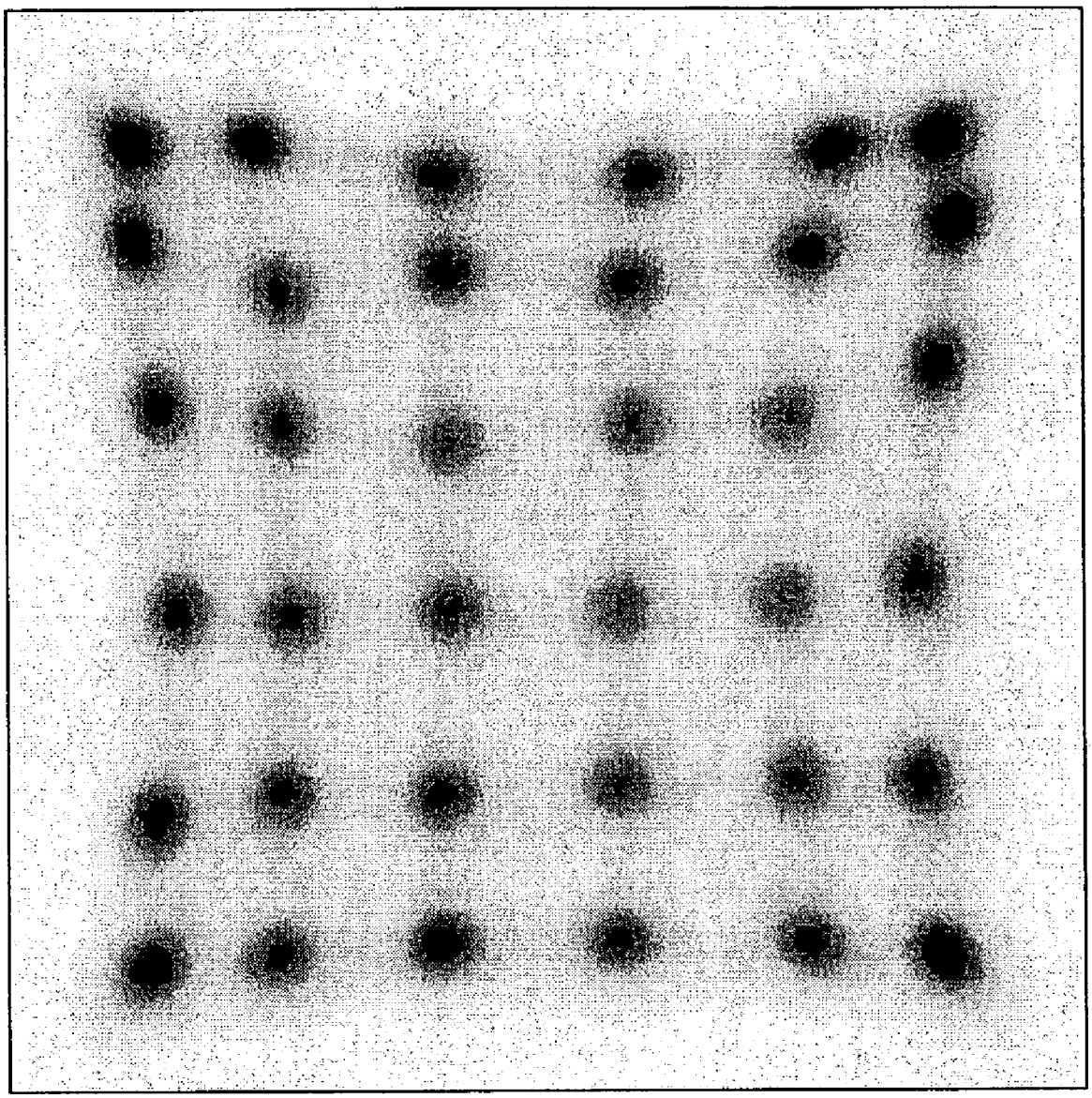
FIG. 5 is a position profile map acquired from a radioactive flood irradiating the array embodied into a block detector.
Figure 6:
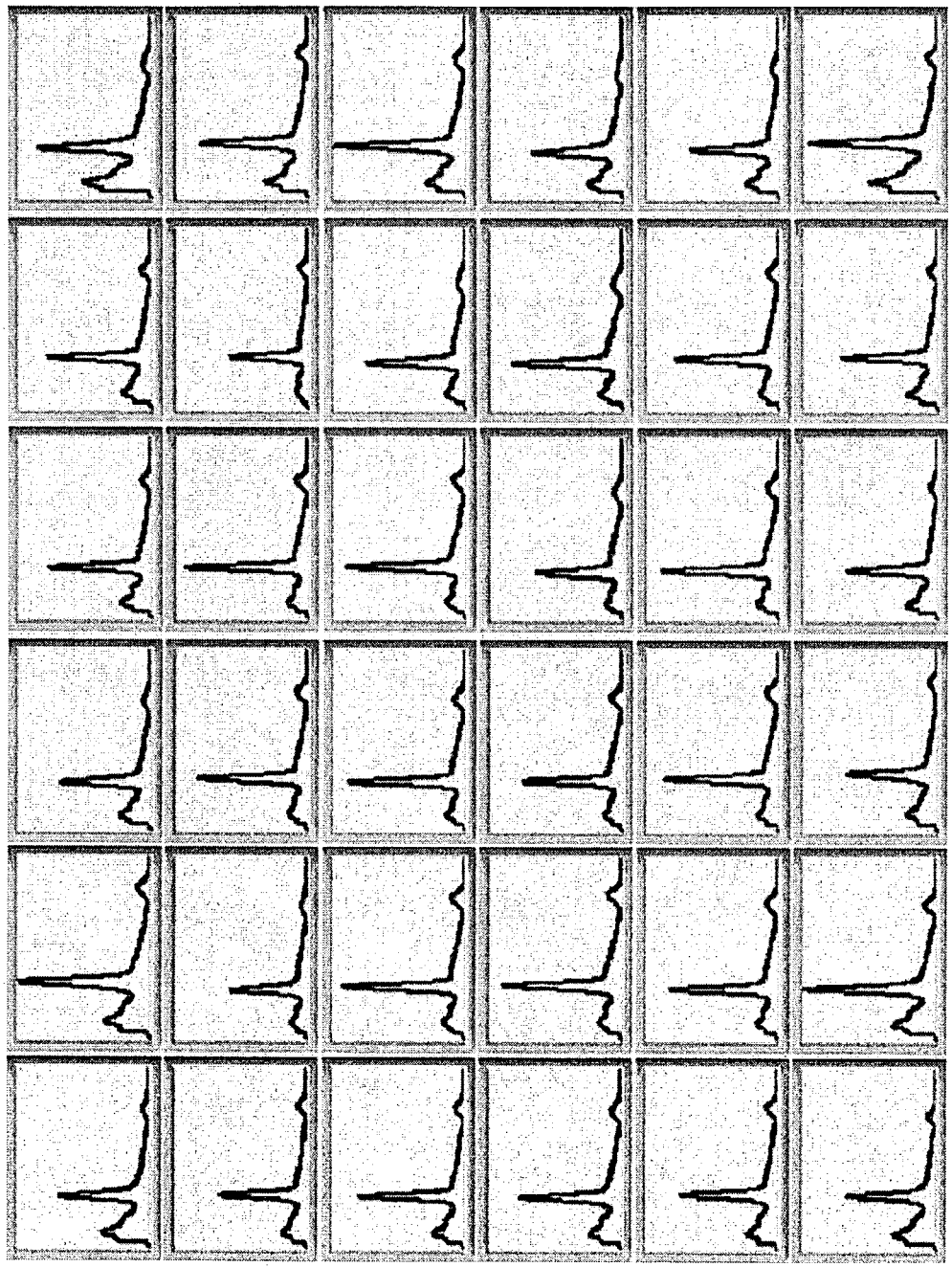
FIG. 6 is an energy resolution map acquired from a radioactive flood irradiating the array embodied into a block detector.

FIG. 5 illustrates a position profile map acquired from flood irradiating a detector array 10 of the present invention. FIG. 6 illustrates the energy spectra relative to each of the scintillator elements 12 in the detector array 10 used to acquire the energy resolution map of FIG. 5.

From the above description, it will be recognized by those skilled in the art that a detector array having high packing fraction and high sensitivity has been disclosed. The detector array is manufactured using a consistent, cost-effective method. The detector array includes a plurality of scintillators for use in imaging applications such as X-ray imaging, fluoroscopy, positron emission tomography (PET), computed tomography (CT), gamma camera and digital mammography systems. The array has an air gap between the scintillator elements, thereby increasing the packing fraction and eliminating the need for light partitions or reflective partitions in between the elements. The change in index of refraction and the surface finish allows light to be collimated along the scintillator elements while controlling cross-talk between the discrete scintillator elements. The air gap will not absorb scintillation photons to a degree such as reflective material.

Therefore, the presented design allows the control of light spread along and between the scintillator elements in the detector array for optimized positioning while maximizing the amount of detectable light photons by the photodetector. Thus, the light output of the array as well as the uniformity of light output from each scintillator element is significantly improved compared to conventional arrays using reflective materials.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of the general inventive concept.

The invention claimed is:

1. A detector array comprising:
an M×N array of scintillator elements, said array of scintillator elements defining a plurality of outermost scintillator elements;
an air gap defined between each adjacent scintillator element of said array, said air gap functioning to reflect light from scintillator elements, such that no reflective material is present between adjacent scintillator elements; and
a mechanism for maintaining a relative position of each of said scintillator elements of said array with respect to each other.

2. The detector array of claim 1 wherein each of said array of scintillator elements defines a top surface, a bottom surface, and a plurality of side surfaces, and wherein each of said plurality of side surfaces is optimized to define a selected light collection efficiency and to control light sharing between said array of scintillator elements.

3. The detector array of claim 1 further comprising at least one photodetector, said array of scintillator elements being coupled to said at least one photodetector.

4. The detector array of claim 3 wherein said mechanism for maintaining a relative position of each of said scintillator elements of said array with respect to each other further includes a bonding agent for bonding each of said array of scintillator elements to said at least one photodetector.

5. The detector array of claim 3 wherein said at least one photodetector is selected from the group consisting of at least a photomultiplier tube, a position sensitive photomultiplier tube, an avalanche photodiode, a pin diode, a CCD, and a solid state detector.

6. The detector array of claim 3 further comprising a light guide disposed between said array of scintillator elements and said at least one photodetector, said scintillator elements being coupled to said at least one photodetector via said light guide.

7. The detector array of claim 6 wherein said mechanism for maintaining a relative position of each of said scintillator elements of said array with respect to each other further includes a bonding agent for bonding each of said array of scintillator elements to said light guide.

8. The detector array of claim 6 wherein said light guide is configured to be continuous over a plurality of said array of scintillator elements and a plurality of said at least one photodetector.

9. A detector array comprising:
an M×N array of scintillator elements, said array of scintillator elements defining a plurality of outermost scintillator elements;
an air gap defined between each adjacent scintillator element of said array, said air gap extending along the entire length of adjacent scintillator elements, wherein no reflective coating is present on a surface of a scintillator element facing said air gap; and
a mechanism for maintaining a relative position of each of said scintillator elements of said array with respect to each other.

10. The detector array of claim 9 wherein each of said array of scintillator elements defines a top surface, a bottom surface, and a plurality of side surfaces, and wherein each of said plurality of side surfaces is optimized to define a selected light collection efficiency and to control light sharing between said array of scintillator elements.

11. The detector array of claim 9 further comprising at least one photodetector, said array of scintillator elements being coupled to said at least one photodetector.

12. The detector array of claim 11 wherein said mechanism for maintaining a relative position of each of said scintillator elements of said array with respect to each other further includes a bonding agent for bonding each of said array of scintillator elements to said at least one photodetector.

13. The detector array of claim 11 wherein said at least one photodetector is selected from the group consisting of at least a photomultiplier tube, a position sensitive photomultiplier tube, an avalanche photodiode, a pin diode, a CCD, and a solid state detector.

14. The detector array of claim 11 further comprising a light guide disposed between said array of scintillator elements and said at least one photodetector, said scintillator elements being coupled to said at least one photodetector via said light guide.

15. The detector array of claim 14 wherein said mechanism for maintaining a relative position of each of said scintillator elements of said array with respect to each other further includes a bonding agent for bonding each of said array of scintillator elements to said light guide.

16. The detector array of claim 14 wherein said light guide is configured to be continuous over a plurality of said array of scintillator elements and a plurality of said at least one photodetector.

17. In a radiation detector having a plurality of scintillator elements arranged in an array and a mechanism for maintaining a relative position of each of said scintillator elements of said array with respect to each other, the improvement comprising:
eliminating the necessity for providing reflective material between adjacent scintillator elements of said array by providing an air gap between adjacent scintillator elements of said array, which air gap serves to collimate scintillation light along an entire length of said scintillator elements.

18. The radiation detector of claim 17, wherein a size of said air gap is defined as a function of surface finish of said scintillator elements.

* * * * *